United States Patent [19]

Doke et al.

[11] 4,413,405

[45] Nov. 8, 1983

[54] METHOD FOR FITTING MAGNETIC WEDGES

[75] Inventors: Hiroshi Doke, Suzuka; Kazunobu Itomi, Yokohama; Kenshi Ishihara, Mie, all of Japan

[73] Assignee: Tokyo Shibaura Denki Kabushiki Kaisha, Kawasaki, Japan

[21] Appl. No.: 316,530

[22] Filed: Oct. 29, 1981

[51] Int. Cl.³ .............................................. H02K 15/00
[52] U.S. Cl. ....................................... 29/596; 29/734; 29/744; 310/214
[58] Field of Search ................... 310/42, 45, 214, 215; 29/732, 734, 744, 596, 598

[56] References Cited

U.S. PATENT DOCUMENTS

| | | | |
|---|---|---|---|
| 1,487,302 | 3/1924 | Willis | 310/214 |
| 2,599,818 | 6/1952 | Evans | 29/732 |
| 3,035,195 | 5/1962 | Jaun et al. | 29/598 |
| 3,436,815 | 4/1969 | Sheets | 310/45 |
| 3,447,009 | 5/1969 | Keuth et al. | |
| 3,527,662 | 9/1970 | Elsworth | 29/596 |
| 3,976,902 | 8/1976 | Simmonds . | |

FOREIGN PATENT DOCUMENTS 56-6653  1/1981  Japan ..................................... 29/596

Primary Examiner—Carl E. Hall
Assistant Examiner—P. W. Echols
Attorney, Agent, or Firm—Oblon, Fisher, Spivak, McClelland & Maier

[57] ABSTRACT

A method for fitting magnetic wedges which comprises steps of passing a current through a stator winding on a stator core of an electric rotary machine to produce magnetic flux passing through slot openings, successively forcing the magnetic wedges in the slot openings while keeping the winding energized to maintain the magnetic wedges in predetermined positions in the slot openings, and impregnating varnish into the stator core with the slot openings fitted with the magnetic wedges and with the stator winding kept energized, and an apparatus for embodying the method.

1 Claim, 3 Drawing Figures

METHOD FOR FITTING MAGNETIC WEDGES

BACKGROUND OF THE INVENTION

This invention relates to a method for fitting magnetic wedges used in the stator slots of an electric rotary machine and an apparatus therefor.

It is generally known that magnetic wedges are used in the stator slots of electric rotary machines, especially large-capacity electric rotary machines. These magnetic wedges, however, are less frequently used in low-voltage, small-capacity electric rotary machines. The reason is that irregularly wound coils are used for the windings with semi-enclosed stator slots which are widely used in the low-voltage, small-capacity electric rotary machines. That is, with the stator slots of this type, the shape and size of coil sides contained therein are not fixed, so that even magnetic wedges of a fixed configuration cannot be held in any fixed positions in the stator slots, often getting too deep into the slots or projecting outside. This will result in variations of the flux distribution in the air gap of the electric rotary machine for each slot. Such result has an awkward effect on the primary object of the use of the magnetic wedges, that is, the object to decrease the difference between the maximum value and minimum value of the flux distribution in the air gap of the electric rotary machine to reduce higher harmonics caused in the core and thereby to reduce the iron loss of the rotary machine by disposing magnetic wedges made of material with a proper permeability in the proper position of the slot openings of the stator slots. Accordingly, there is a demand for the appearance of a method and apparatus to eliminate such awkward effect.

SUMMARY OF THE INVENTION

The object of this invention is to provide a method and apparatus for substantially uniformly and easily fitting magnetic wedges in the stator of an electric rotary machine using an irregularly wound coil.

In order to attain the above object, the method of this invention comprises steps of energizing a stator winding on a stator core of an electric rotary machine to produce magnetic flux passing through slot openings, successively forcing magnetic wedges made of a ferromagnetic material in the slot openings while keeping the winding energized to maintain the magnetic wedges in predetermined positions in the slot openings by the process of attraction of the magnetic flux passing through the slot openings, and impregnating varnish into the stator core with the slot openings fitted with the magnetic wedges and with the winding kept energized, thereby fixing the magnetic wedges to the predetermined positions in the slot openings, and the apparatus of the invention comprises a core base rotatably carrying a stator core having stator slots with a winding thereon, an exciting means for passing current through the winding to produce magnetic flux at slot openings at the edges of the stator slots, an attraction plate for forcing the magnetic wedges in the slot openings to maintain the magnetic wedges in predetermined positions in the slot openings by the agency of the magnetic flux produced at the slot openings, and a driving unit for driving the attraction plate to move each of the magnetic wedges from a supply position to a position where the magnetic wedges are arranged along the slot openings.

When the magnetic wedges are fitted in the slot openings of the stator core by using the aforementioned method and apparatus, they bridge the gaps between the tips of stator teeth on both sides of each slot opening in the predetermined positions in the slot openings. Accordingly, the flux distribution in the air gap of the electric rotary machine constructed with use of the stator core formed in this manner will not suffer the drastic reduction of the flux which is caused at the slot openings without the use of the magnetic wedges. As a result, the flux distribution in the main magnetic flux of the electric rotary machine will be reduced in higher harmonics to reduce the iron loss of the electric rotary machine. Thus, the operating efficiency of the electric rotary machine can be increased.

DETAILED DESCRIPTION OF THE PREFERRED EMBODIMENT

Figure 1:
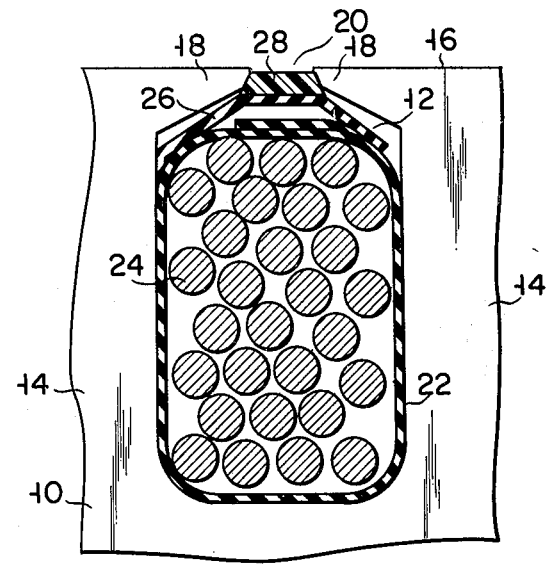
FIG. 1 is an enlarged sectional view of one stator slot of a stator core formed by the method and apparatus of this invention.

FIG. 1 is an enlarged sectional view of a semi-enclosed stator slot 12 formed in a stator core 10 of an electric rotary machine. The stator slot 12 is formed between two stator teeth 14, and a narrow slot opening 20 is defined in the inner periphery 16 of the stator core 10 by the tips 18 of the stator teeth 14. An irregular winding 24 enclosed in an insulating material 22 is contained in the stator slot 12, and a first wedge 26 made of a nonmagnetic material is inserted in the slot 12 on the slot opening side of the winding 24. FIG. 1 shows a state in which a second wedge or magnetic wedge 28 bridging the slot opening 20 between the tips 18 is inserted and held in place by a method and apparatus mentioned later. Formed of a flexible nonmagnetic material e.g. plastics mixed with powders of a magnetic material with a suitable high permeability, the magnetic wedge 28 is located in a substantially fixed position in the slot opening 20 by the method and apparatus of this invention. In each drawing the section of the magnetic wedge is shown as a plastics.

Figure 2:
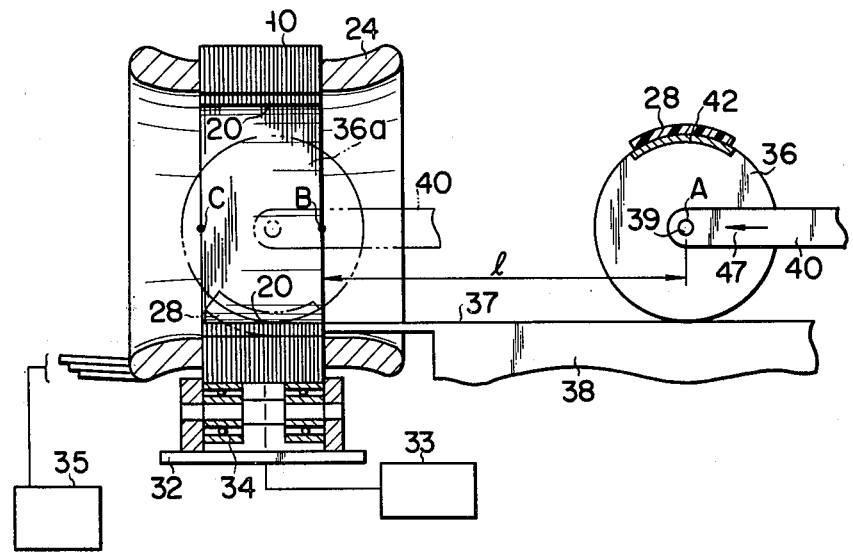
FIG. 2 is a side view showing an embodiment of the apparatus of the invention.

FIG. 2 shows the apparatus embodying the method of the invention. A pair of ball bearings 34 are laid on a base 32, and the stator core 10 with the stator winding 24 thereon is mounted on the ball bearings 34 so as to be able to rotate around an axis extending horizontally in FIG. 2. The stator core 10 can be located manually or by an automatic driving unit 33 so that a desired one of the stator slots may lie horizontally in the lowest position of the inner periphery of the stator core 10. The winding 24 is supplied by a suitable power source 35 with a low current equal to e.g. aproximately ½ of the rated current to form a magnetic flux which extends from the tip 18 of the one of the two adjacent stator teeth 14 to the tip 18 of the other across the slot opening 20.

FIG. 2 shows a state in which the slot opening 20 of one stator slot 12 (FIG. 1) is located at its lowest level as a result of the rotation of the stator core 10 on the ball bearings 34. A discoid attraction plate 36 on the right of FIG. 2 can roll on a horizontal platform 38 with a surface 37 extending horizontally and substantially flush with the lowest portion of the inner periphery of the stator core 10. The attraction plate 36 is attached to a moving member 40 which is moved from side to side by a horizontal driving unit (not shown), with its shaft 39 at right angles to the plane of the drawing. When the moving member 40 is moved to the left, the attraction plate 36 rolls on the platform 38 to the left, and passes over the stator slot 12 at the lowest level. A wedge attracting portion 42 is formed on the surface of the attraction plate 36 along the circumferential direction thereof. The magnetic wedge 28 of a given length is attracted to the wedge attracting portion 42 while it is projected from the attraction plate 36. The magnetic wedges 28 are intermittently supplied one by one by a supply unit (not shown). The attracting portion 42 is excited by a magnetic circuit (not shown) formed of an exciting coil and a core to attract each supplied magnetic wedge 28 to a predetermined position. In this case, the current to be passed through the winding 24 of the stator core 10 is determined so that the force of the attracting portion 42 to attract the magnetic wedge 28 is ½ to 4/5 of the force whereby the magnetic wedge 28 is attracted to the magnetic flux produced at the slot opening 20 by the winding 24.

After the stator core 10 is rotated on the ball bearings 34 so that one of the slot openings 20 is moved to the lowest level, the magnetic wedge 28 is attracted to the attracting portion 42 of the attraction plate 36 off to the right of the stator core 10. Subsequently, when the moving member 40 is moved in the direction of an arrow 47, the attraction plate 36 rolls to the left on the platform 38 to pass over and along the slot opening 20 of the stator core 10. At this time, the magnetic wedge 28 projectingly attracted to the attraction plate 36 is forced in the slot opening 20. In this state, the magnetic wedge 28 once forced in the slot opening 20 is drawn by the excitation of the winding 24 into the slot opening 20 with a greater force than the attraction of the attracting portion 42 of the attraction plate 36. Accordingly, even when the attraction plate 36 thereafter passes over the slot opening 20, the magnetic wedge 28 will never be drawn out again by the attraction plate 36.

For the smoothness of the aforesaid operation, the distance l between a position A of the shaft 39 of the attraction plate 36 where the plate 36 attracts the magnetic wedge 28 and a position B where the shaft 39 faces the right end of the stator core 10 is determined so that one end of the magnetic wedge 28 attached to the attraction plate 36 may be pushed in the right end portion of the slot opening 20 when the shaft 39 of the attraction plate 36 reaches the position B. As a result, when the shaft 39 of the attraction plate 36 reaches the left end C of the stator core 10, the other end of the magnetic wedge 28 attached to the attraction plate 36 is pushed in the left end portion of the slot opening 20. A circle 36a described around a point near the center of the stator core 10 indicates the position of the attraction plate 36 with the magnetic wedge 28 partially in the slot opening 20.

After the magnetic wedge 28 attached to the attraction plate 36 is forced in the slot opening 20, the attracting portion 42 of the attraction plate 36 ceases to be excited. Then, the magnetic wedge 28 is drawn to and held in a position depending mainly on the shapes and dimensions of the slot opening 20 and the magnetic wedge 28 by magnetic attraction caused by the current flowing through the winding 24. In this state, the attraction plate 36 is moved to the right to attract another magnetic wedge 28 to the attraction portion 42, the driving unit 33 is operated to rotate the stator core 10 by one slot pitch, and the aforementioned operation is performed again. Thus, by repeating these processes, the magnetic wedges 28 can be located in the predetermined positions in all the slot openings 20 of the stator core 10.

Then, the stator core 10 is removed from the base 32 while current is flowing through the winding 24, and impregnated with varnish. By doing this, the magnetic wedges 28 are fixed to the predetermined positions, and will never be displaced even if the supply of the current is stopped.

By the use of the above-mentioned apparatus and method, the magnetic wedge 28 can securely be fixed in a substantially fixed position so as to bridge the slot opening 20. Moreover, the insertion of the magnetic wedge 28 into the slot opening 20 is automated with use of the attraction plate 36 and the moving member 40, so that mass production is facilitated and the magnetic loss of electric rotary machines obtained can be reduced. Thus, the operating efficiency of the electric rotary machines increases. In miniature rotary machines, such increase in efficiency reaches 1% or more.

Figure 3:
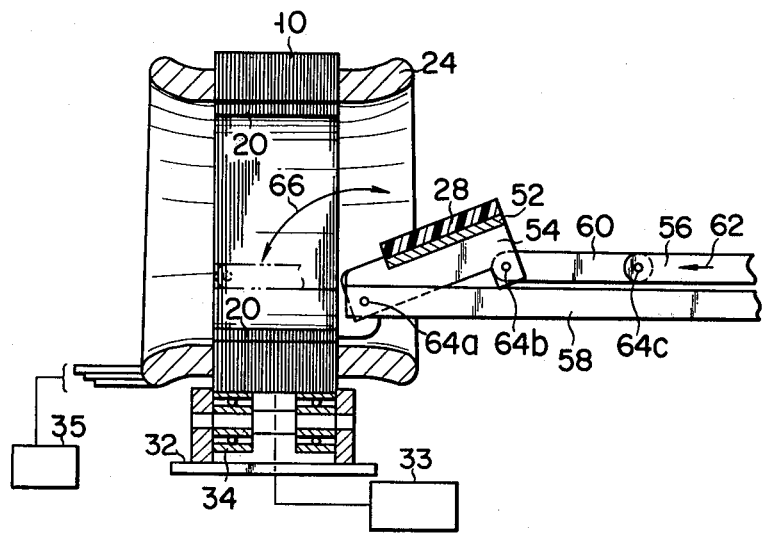
FIG. 3 is a side view showing another embodiment.

FIG. 3 shows an embodiment different from the one shown in FIG. 2. As may be seen from FIG. 3, this embodiment has the same construction as the embodiment of FIG. 2 except the mechanism for receiving a magnetic wedge from a supply unit (not shown) and forcing it in the slot opening of the stator core. Such mechanism will therefore be described in the main below.

In this embodiment, the attraction plate 36 used in the embodiment of FIG. 2 is replaced with a rotating plate 54 which rotates around a shaft 64a located at right angles to the plane of the drawing in a position fixed relatively to a stator core 10. The rotating plate 54 is substantially rectangular in shape, and is fitted at its upper edge portion with an attracting portion 52 which attracts a magnetic wedge 28. The attracting portion 52 is excited in the same manner as the attracting portion 42 in the embodiment of FIG. 2. A link 60 with one end mounted on a shaft 64b normal to the plane of the drawing is attached to one end portion of the rotating plate 54 with the shaft 64a attached to the other end portion thereof. A shaft 64c attached to the other end of the link 60 is coupled with a moving member 56 which is reciprocated in the direction of an arrow 62 by a driving unit (not shown). When the moving member 56 is moved to the left in the direction of the arrow 62, the link 60 rotates clockwise around the shaft 64c, while the rotating plate 54 rotates counterclockwise around the shaft 64a. By the rotation of the rotating plate 54, the magnetic wedge 28 attached to the attracting portion 52 can reach a horizontal position. The shaft 64a is located so that the magnetic wedge 28 may then be forced in the slot opening 20 of the lowest one of stator slots 12. In FIG. 3, numeral 58 designates a platform for supporting the shaft 64a and guiding the moving member 62 in its longitudinal movement. When the insertion of the magnetic wedge 28 in the slot opening 20 is finished in the state shown in FIG. 3, the rotation plate 54 is rotated clockwise to cause the attracting portion 52 to attract another magnetic wedge 28. By rotating the stator core 10 by one slot pitch and repeating the aforesaid operation, the magnetic wedge 28 can be fitted in the next slot opening 20. By repeatedly performing these processes, magnetic wedges 28 can be fitted in the predetermined positions in all the slot openings 20.

What we claim is:

1. A method for fitting magnetic wedges in stator slots in a stator core of an electric rotary machine, comprising steps of:

energizing a winding on the stator core of the electric rotary machine to produce magnetic flux passing through slot openings;

successively forcing the magnetic wedges in said slot openings while keeping said winding energized to maintain said magnetic wedges in predetermined positions in said slot openings by the agency of attraction of said magnetic flux; and impregnating varnish into said stator core with said slot openings fitted with said magnetic wedges and with said winding kept energized, thereby fixing said magnetic wedges to said predetermined positions in said slot openings.

* * * * *